US010491663B1

(12) United States Patent
White et al.

(10) Patent No.: US 10,491,663 B1
(45) Date of Patent: Nov. 26, 2019

(54) HETEROGENEOUS COMPUTATIONS ON HOMOGENEOUS INPUT DATA

(71) Applicant: Amazon Technologies, Inc., Reno, NV (US)

(72) Inventors: Taylor James White, Seattle, WA (US); Albert Cooper Johnson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 641 days.

(21) Appl. No.: 14/065,102

(22) Filed: Oct. 28, 2013

(51) Int. Cl.
*G06F 15/16* (2006.01)
*G06F 17/30* (2006.01)
*G06F 15/173* (2006.01)
*H04L 29/08* (2006.01)

(52) U.S. Cl.
CPC .................................. *H04L 67/10* (2013.01)

(58) Field of Classification Search
CPC . G06F 9/50; G06F 17/30563; G06F 17/30545
USPC ........................................................ 709/201
See application file for complete search history.

(56) References Cited

U.S. PATENT DOCUMENTS

| 7,694,107 B2 | 4/2010 | Lin et al. | |
|---|---|---|---|
| 8,448,135 B2 | 5/2013 | Kodosky | |
| 9,152,668 B1* | 10/2015 | Moskovitz | G06F 16/2453 |
| 2008/0114725 A1* | 5/2008 | Indeck | G06F 16/22 |
| 2008/0263557 A1* | 10/2008 | Spata | G06F 9/4881 |
| | | | 718/104 |
| 2008/0294996 A1* | 11/2008 | Hunt | G06Q 30/02 |
| | | | 715/739 |
| 2009/0006156 A1* | 1/2009 | Hunt | G06Q 30/02 |
| | | | 705/7.11 |
| 2009/0006309 A1* | 1/2009 | Hunt | G06Q 30/02 |
| 2009/0158248 A1* | 6/2009 | Linderman | G06F 9/505 |
| | | | 717/106 |
| 2010/0131444 A1* | 5/2010 | Gottlieb | G06N 5/04 |
| | | | 706/46 |
| 2010/0223385 A1* | 9/2010 | Gulley | G06F 9/5027 |
| | | | 709/226 |

(Continued)

OTHER PUBLICATIONS

Jeffrey Dean and Sanjay Ghemawat, "MapReduce: Simplified Data Processing on Large Clusters," OSDI '04, pp. 137-149, USENIX Association, Nov. 2004. Source: https://www.usenix.org/legacy/events/osdi04/tech/full_papers/dean/dean.pdf.

*Primary Examiner* — Kevin T Bates
*Assistant Examiner* — Mark A Scott
(74) *Attorney, Agent, or Firm* — Robert C. Kowert; Meyertons, Hood, Kivlin, Kowert & Goetzel, P.C.

(57) ABSTRACT

Methods and systems for performing heterogeneous computations on homogeneous input data are disclosed. A plurality of computational specifications are distributed among a plurality of worker nodes. The computational specifications comprise definitions of a plurality of heterogeneous computations. The heterogeneous computations are performed using the worker nodes. Individual ones of the heterogeneous computations are performed based on the set of input data and corresponding ones of the computational specifications, and individual ones of the heterogeneous computations produce respective results. An aggregate result is generated based on the respective results of the heterogeneous computations.

20 Claims, 8 Drawing Sheets

(56) References Cited

U.S. PATENT DOCUMENTS

| | | | |
|---|---|---|---|
| 2010/0281166 A1* | 11/2010 | Buyya | G06F 9/5072 709/226 |
| 2011/0154350 A1* | 6/2011 | Doyle | G06F 9/5044 718/104 |
| 2011/0178719 A1* | 7/2011 | Rabinowitz | C12Q 1/6883 702/19 |
| 2011/0178949 A1* | 7/2011 | Apte | G06Q 10/067 705/348 |
| 2011/0228668 A1* | 9/2011 | Pillai | G06F 11/2023 370/217 |
| 2011/0302226 A1* | 12/2011 | Abadi | G06F 17/30569 707/825 |
| 2011/0302583 A1* | 12/2011 | Abadi | G06F 17/30545 718/102 |
| 2012/0110055 A1* | 5/2012 | Van Biljon | G06Q 30/04 709/201 |
| 2012/0110063 A1* | 5/2012 | Prasad | G06Q 10/06 709/203 |
| 2012/0124591 A1* | 5/2012 | Cadambi | G06F 9/505 718/103 |
| 2012/0159506 A1* | 6/2012 | Barham | G06F 9/5044 718/104 |
| 2012/0198466 A1* | 8/2012 | Cherkasova | G06F 9/5066 718/104 |
| 2012/0278464 A1* | 11/2012 | Lehane | H04L 12/1407 709/223 |
| 2012/0310916 A1* | 12/2012 | Abadi | G06F 17/30445 707/713 |
| 2012/0317579 A1* | 12/2012 | Liu | G06F 11/1438 718/104 |
| 2013/0073724 A1* | 3/2013 | Parashar | G06F 9/5072 709/224 |
| 2013/0090906 A1* | 4/2013 | AlShaikh | G06F 9/5072 703/10 |
| 2013/0104140 A1* | 4/2013 | Meng | G06F 9/5066 718/104 |
| 2013/0116993 A1* | 5/2013 | Maliassov | G01V 9/00 703/2 |
| 2013/0205028 A1* | 8/2013 | Crockett | G06F 9/5027 709/226 |
| 2013/0275363 A1* | 10/2013 | Wu | G06F 9/46 707/602 |
| 2013/0311426 A1* | 11/2013 | Erdogan | G06F 17/30575 707/610 |
| 2013/0311441 A1* | 11/2013 | Erdogan | G06F 17/30578 707/713 |
| 2013/0332194 A1* | 12/2013 | D'Auria | G16H 10/60 705/3 |
| 2013/0346988 A1* | 12/2013 | Bruno | G06F 9/5066 718/102 |
| 2014/0074850 A1* | 3/2014 | Noel | G06F 11/0709 707/741 |
| 2014/0107828 A1* | 4/2014 | Zhu | G01R 31/2831 700/121 |
| 2014/0115596 A1* | 4/2014 | Khan | G06F 9/5011 718/104 |
| 2014/0130056 A1* | 5/2014 | Goodman | G06F 9/5044 718/104 |
| 2014/0181831 A1* | 6/2014 | Le Scouarnec | G06F 9/5066 718/104 |
| 2014/0195558 A1* | 7/2014 | Murthy | G06F 17/30545 707/770 |
| 2014/0201744 A1* | 7/2014 | Chu | G06F 9/4843 718/100 |
| 2014/0201753 A1* | 7/2014 | He | G06F 9/5066 718/104 |
| 2014/0214383 A1* | 7/2014 | Haas | G06F 17/5009 703/6 |
| 2014/0215003 A1* | 7/2014 | Mizobuchi | G06F 15/17331 709/213 |
| 2014/0236872 A1* | 8/2014 | Keshava | G06F 19/00 706/12 |
| 2014/0236943 A1* | 8/2014 | Li | G06F 17/30699 707/736 |
| 2014/0259156 A1* | 9/2014 | Beutel | H04L 63/1416 726/22 |
| 2014/0310258 A1* | 10/2014 | Tian | G06F 17/30445 707/718 |
| 2014/0310259 A1* | 10/2014 | Tian | G06F 17/30545 707/718 |
| 2014/0333638 A1* | 11/2014 | Kaminski | G06F 15/17 345/522 |
| 2015/0007196 A1* | 1/2015 | Toll | G06F 9/5083 718/105 |
| 2015/0012629 A1* | 1/2015 | Verma | H04L 67/10 709/223 |
| 2015/0088807 A1* | 3/2015 | Toppin | G06F 17/30563 707/602 |
| 2015/0120750 A1* | 4/2015 | Hefeeda | G06F 17/30961 707/741 |
| 2015/0121371 A1* | 4/2015 | Gummaraju | G06F 17/30194 718/1 |
| 2015/0310087 A1* | 10/2015 | Tidwell | G06F 17/30569 713/189 |

\* cited by examiner

HETEROGENEOUS COMPUTATIONS ON HOMOGENEOUS INPUT DATA

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. As the scale and scope of typical data centers has increased, the tasks of provisioning, administering, and managing the physical computing resources have become increasingly complicated.

Examples of such large-scale systems include online merchants, internet service providers, online businesses such as photo processing services, corporate networks, cloud computing services, web-based hosting services, etc. These entities may maintain computing resources in the form of large numbers of computing devices (e.g., thousands of hosts) which are hosted in geographically separate locations and which are configured to process large quantities (e.g., millions) of transactions daily or even hourly. A conventional approach for harnessing these resources is the MapReduce model for distributed, parallel computing. In a MapReduce system, a large data set may be broken into smaller chunks, and the smaller chunks may be distributed to multiple nodes in a cluster. Each node in the cluster may implement the same algorithm for processing each respective chunk of the data set. In other words, a MapReduce system may represent a solution for performing homogeneous computations on heterogeneous input data.

Figure 1:
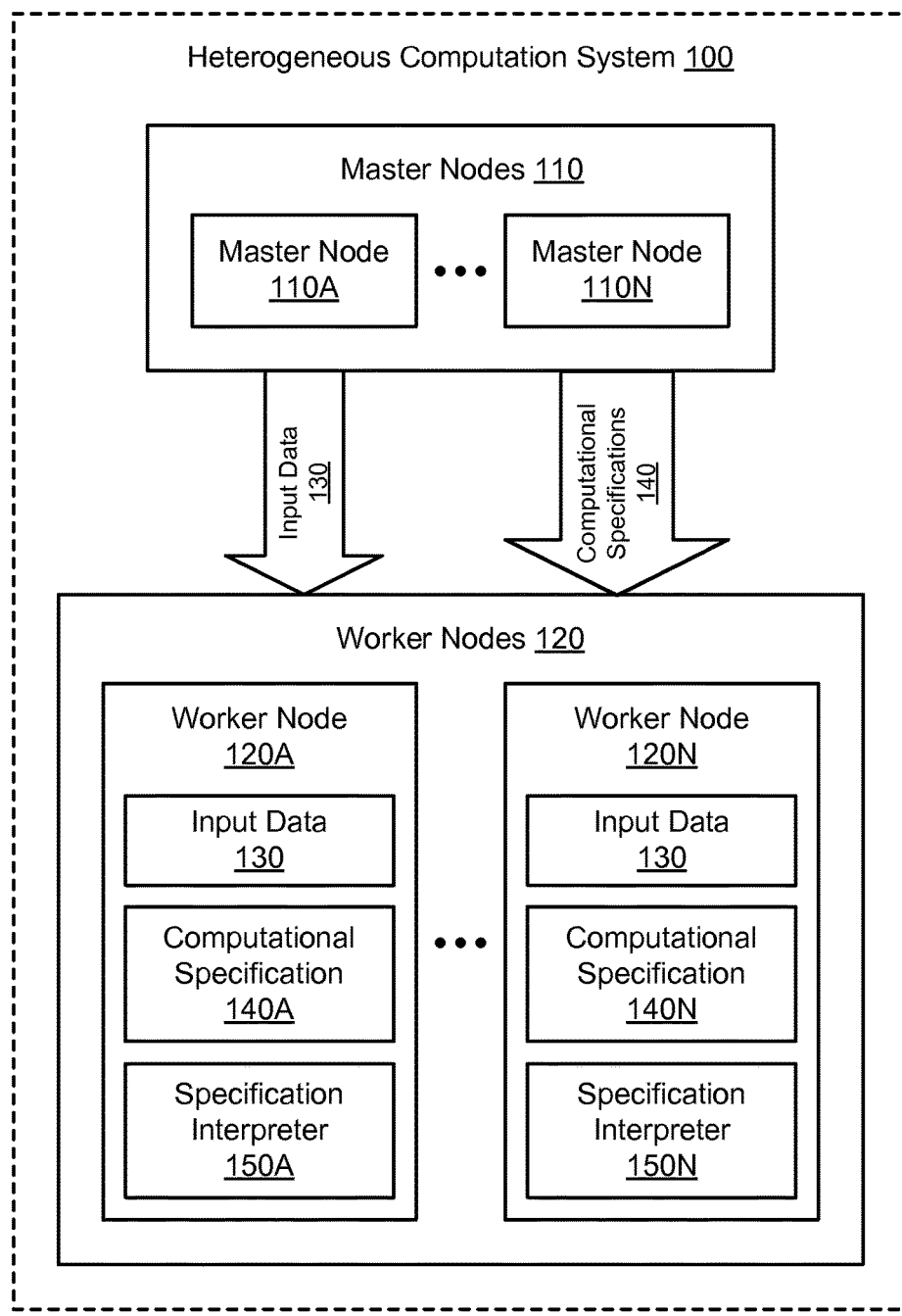
FIG. 1 illustrates an example system environment for performing heterogeneous computations on homogeneous input data, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for performing heterogeneous computations on homogeneous input data are described. Using a heterogeneous computation system as described herein, different algorithms and/or implementations of an algorithm may be used to process a set of input data. In one embodiment, the same set of input data may be used by multiple tasks on different worker nodes. The multiple tasks may represent different algorithms or computing strategies for solving a problem or may represent different implementations of the same algorithm. The results of the different tasks may be aggregated to produce an aggregate or final result. For example, the aggregate result may represent a combination of the individual results of the tasks or a selection of one of the individual results. Accordingly, in contrast to a conventional MapReduce system that processes many inputs in a single way, the heterogeneous computation system may be used to process the same set of inputs in different ways The heterogeneous computation system may offer a generic and extensible framework for quickly solving various types of problems.

In one embodiment, a heterogeneous computation system may manage the allocation of network-accessible resources. Networks set up by an entity such as a company or a public sector organization to provide one or more services (such as various types of cloud-based computing or storage) accessible via the Internet and/or other networks to a distributed set of clients may be termed provider networks. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In one embodiment, operators of provider networks may implement a flexible set of resource reservation, control, and access interfaces for their clients. For example, a provider network may implement a programmatic resource reservation interface (e.g., via a web site or a set of web pages) that allows clients to learn about, select, purchase access to, and/or reserve resource instances. In one embodiment, resources may be reserved on behalf of clients using a client-accessible service that implements a heterogeneous computation system. According to one such embodiment, a heterogeneous computation system in such an environment may receive a specification of various tasks to be performed for a client, along with a set of input data or an indication of a source of input data to be used by the various tasks. The various tasks may represent different algorithms or computing strategies. In response, the heterogeneous computation system may determine an execution plan for implementing the various tasks using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client. The heterogeneous computation system may schedule an execution of the various tasks using the selected resources.

In one embodiment, the client may use one or more suitable interfaces (such as one or more web pages, an application programming interface [API], or a command-line interface [CLI]) to specify the various tasks to be implemented, the input data set, the computing resources to be used, and/or a time at which the tasks should be initiated. In one embodiment, the client may be able to view the current execution status of the various tasks using the interface(s). In one embodiment, additional information about executed tasks may be available via the interface(s), such as program output, error logs, exception logs, and so on.

FIG. 1 illustrates an example system environment for performing heterogeneous computations on homogeneous input data, according to one embodiment. A heterogeneous computation system 100 may include a set of master nodes 110 and a set of worker nodes 120. In general, the master nodes 110 may distribute different tasks to the worker nodes 120, and the worker nodes 120 may implement the different tasks. Although two master nodes 110A and 110N are shown for purposes of example and illustration, it is contemplated that different numbers and configurations of master nodes may be used. In one embodiment, for example, only one master node (e.g., master node 110A) may be used for heterogeneous computations on a set of input data. Similarly, although two worker nodes 120A and 120N are shown for purposes of example and illustration, it is contemplated that different numbers and configurations of worker nodes may be used. Additionally, it is contemplated that the heterogeneous computation system 100 may include fewer components than shown, additional components not shown, or different combinations or quantities of the components shown.

Figure 8:
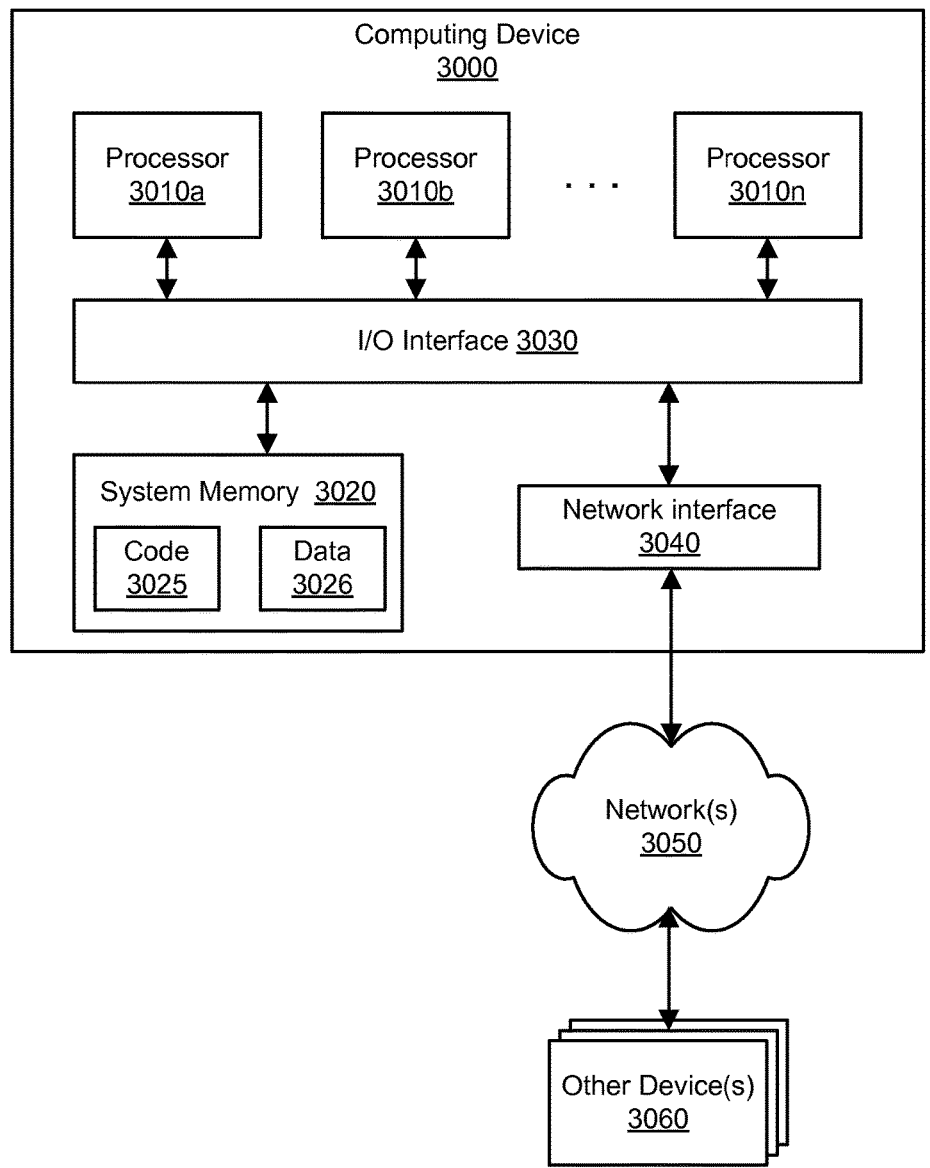
FIG. 8 illustrates an example of a computing device that may be used in some embodiments.

The heterogeneous computation system 100 may comprise one or more computing devices, any of which may be implemented by the example computing device 3000 illustrated in FIG. 8. In various embodiments, portions of the functionality of the heterogeneous computation system 100, the master nodes 110, or worker nodes 120 may be provided by the same computing device or by any suitable number of different computing devices. If any of the components of the heterogeneous computation system 100 are implemented using different computing devices, then the components and their respective computing devices may be communicatively coupled, e.g., via a network. Each of the illustrated components may represent any combination of software and hardware usable to perform their respective functions.

In some embodiments, the master nodes 110 and worker nodes 120 may be implemented as virtual compute instances or physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 8.

In one embodiment, a suitable component of the heterogeneous computation system 100, such as one or more of the master nodes 110, may select and/or provision the worker nodes 120 to be used for the heterogeneous computations. For example, the worker nodes 120 may be provisioned from a suitable pool of available worker nodes. In one embodiment, the worker nodes 120 need not be similarly configured, because they are not expected to perform the same computation, in contrast to a conventional MapReduce implementation. However, individual ones of the worker nodes 120 may be selected based on their suitability for performing particular tasks of the heterogeneous computations.

The master node(s) 110 may represent one or more coordinator processes that coordinate the heterogeneous computations. In one embodiment, the master node(s) 110 may provide the worker nodes 120 with a set of input data 130 as well as a set of computational specifications 140. In various embodiments, the master node(s) 110 may send the input data 130 directly to the worker nodes 120 or otherwise provide the worker nodes 120 with information indicative of the input data 130, such as one or more links or references. In another embodiment, however, the worker nodes 120 may acquire the input data 130 independently of the master node(s) 100. Similarly, the master node(s) 110 may send the computational specifications 140 directly to the worker nodes 120 or otherwise provide the worker nodes 120 with information indicative of the computational specifications 140, such as one or more links or references. In one embodiment, the computational specifications 140 may be provided to the worker nodes 120 by storing the computational specifications 140 in storage locations that are accessible to the worker nodes 120. Each of the computational specifications 140 may specify an algorithm or computing strategy for performing a particular task (potentially including multiple sub-tasks or operations). In general, the computational specifications 140 may define arbitrary computations. For example, the computational specifications 140 may include sets of binary program code to be executed, sets of high-level program code to be compiled and executed, sets of instructions to be interpreted, descriptions of requests to be sent to services, requests to invoke functions or services, other suitable types of information defining tasks or operations to be performed, or combinations thereof. In general, each of the computational specifications 140 may define a computation, algorithm, or computing strategy for acting upon all or part of the input data 130. In one embodiment, each of the computational specifications 140 may also indicate the computational requirements to carry out the task(s), such as an indication of the type of program code, bytecode, etc., to be executed or interpreted to implement a particular task.

The different tasks represented by the different computational specifications 140 may be implemented by the worker nodes 120. Each task may be implemented using a particular computation, and the computations may differ for each of the worker nodes 120. Each of the worker nodes 120, such as worker nodes 120A-120N, may store a local copy of all or part of the input data 130 for carrying out the various tasks. Each worker node may include a specification interpreter that is capable of acting upon a computational specification to perform the specified task. For example, if the computational specification represents binary code or bytecode, then the corresponding specification interpreter may include a suitable execution environment for the code. Examples of types of specification interpreters are further discussed with reference to FIGS. 4A-4D. As shown in the example of FIG. 1, the worker node 120A may include a specification interpreter 150A that is configured to implement the computational specification 140A, and the worker node 120N may include a specification interpreter 150N that is configured to implement the computational specification 140N. The specification interpreter 150A may differ from the specification interpreter 150N due to the nature of the corresponding computational specifications 140A and 140N. However, the specification interpreters 150A and 150N may also be different instances of the same interpreter. In one embodiment, the different tasks represented by the different computational specifications 140 may be performed in parallel (at least in part) due to the lack of dependencies between the tasks. However, the different tasks may also be performed in series (at least in part).

Figure 2:
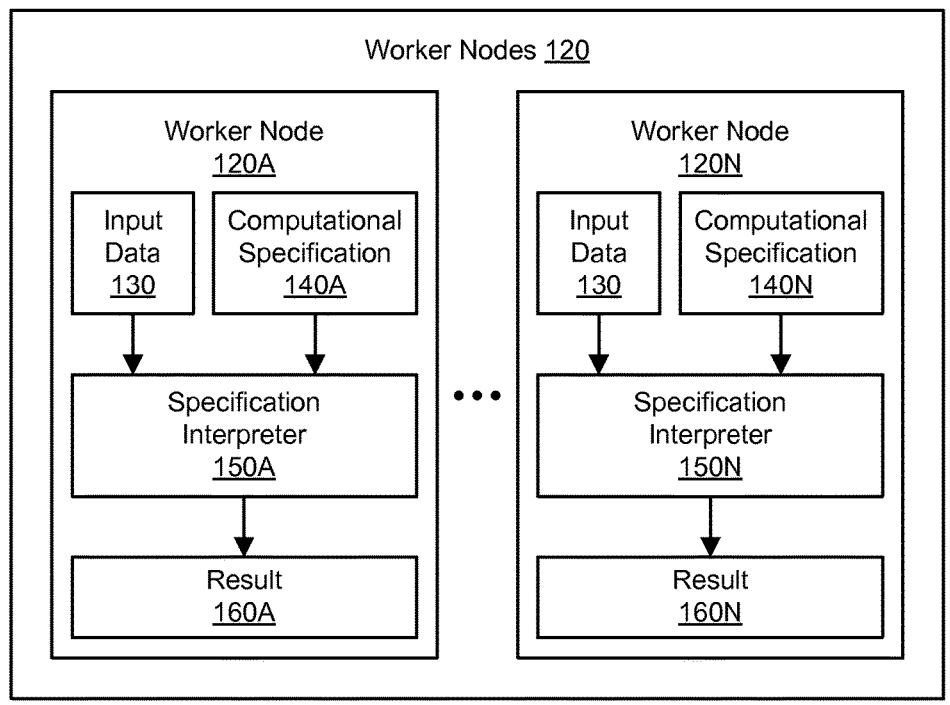
FIG. 2 illustrates aspects of worker nodes in an example system environment for performing heterogeneous computations on homogeneous input data, according to one embodiment.

FIG. 2 illustrates aspects of worker nodes in an example system environment for performing heterogeneous computations on homogeneous input data, according to one embodiment. As discussed above, the worker node 120A may include a specification interpreter 150A that is configured to implement the computational specification 140A, and the worker node 120N may include a specification interpreter 150N that is configured to implement the computational specification 140N. Along with the computational specification 140A, all or part of the input data 130 may be loaded into or otherwise provided to the specification interpreter 150A to implement the corresponding task (potentially including sub-tasks or multiple operations). Similarly, along with the computational specification 140N, all or part of the input data 130 may be loaded into or otherwise provided to the specification interpreter 150N to implement the corresponding task (potentially including sub-tasks or multiple operations). In one embodiment, both tasks corresponding to the computational specifications 140A and 140N may use substantially all of the input data 130. However, it is contemplated that either of the computational specifications 140A or 140N may use only part of the input data 130.

In performing the task specified by the computational specification 140A, the specification interpreter 150A may produce a result 160A. Likewise, in performing the task specified by the computational specification 140N, the specification interpreter 150N may produce a result 160N. The results 160A and 160N may include output values of the corresponding tasks. However, it is contemplated that any of the tasks may transform an underlying state of a system (e.g., a state of the worker nodes 120A or 120N) instead of or in addition to producing output values.

Figure 3:
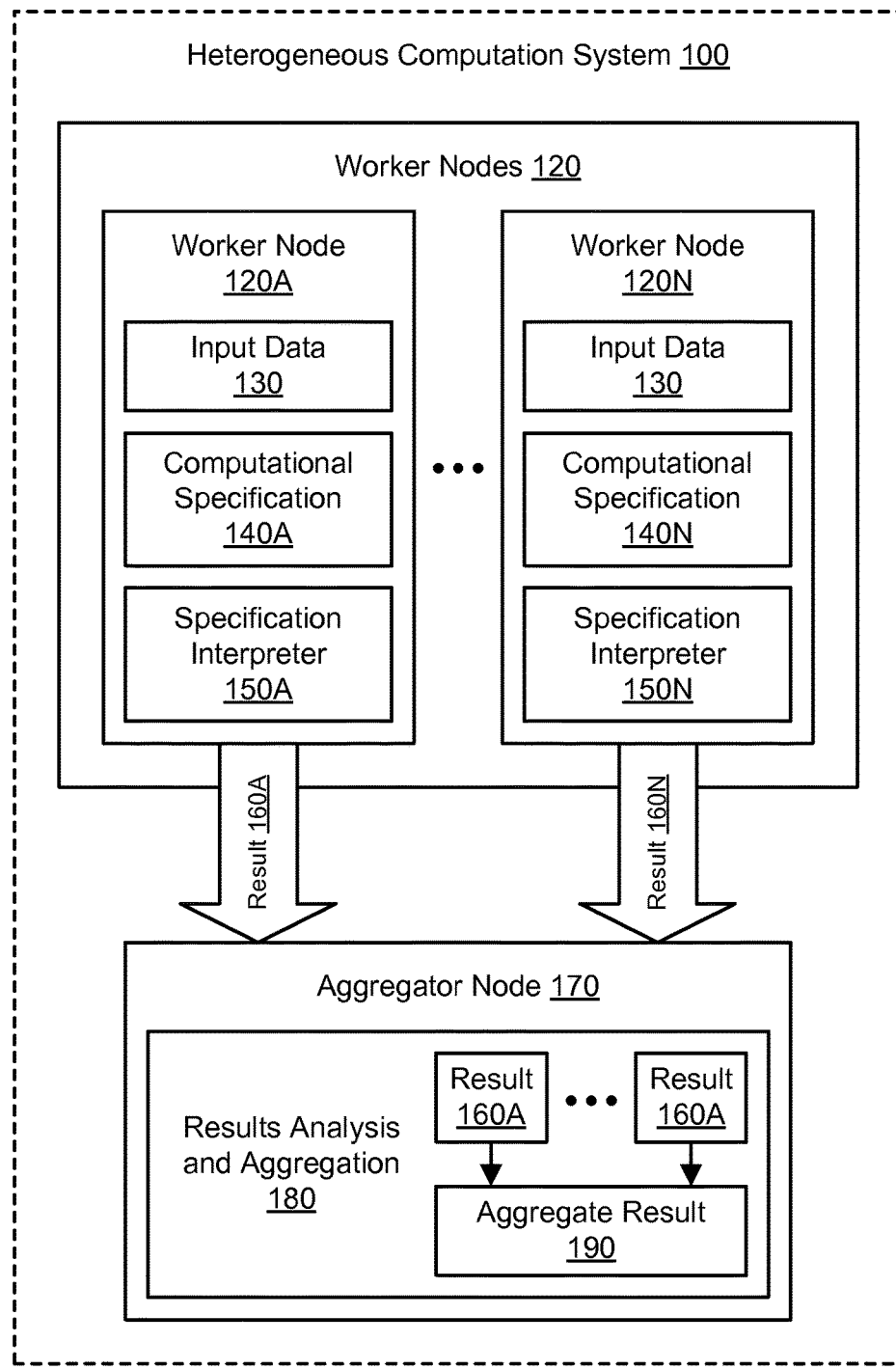
FIG. 3 illustrates further aspects of an example system environment for performing heterogeneous computations on homogeneous input data, according to one embodiment.

FIG. 3 illustrates further aspects of an example system environment for performing heterogeneous computations on homogeneous input data, according to one embodiment. As discussed above, in one embodiment, each of the worker nodes may produce a result of its local computation. As shown in FIG. 3, the worker node 120A may produce a result 160A, and the worker node 120N may produce a result 160N. In one embodiment, the results 160A-160N may be provided to an aggregator node 170. The results 160A-160N may be generated and provided to the aggregator node 170 at different times, e.g., based on the underlying computations at the different worker nodes. The results 160A-160N may be provided to the aggregator node 170 using any suitable technique, such as by storing the results 160A-160N in storage locations that are accessible to the aggregator node 170 or by sending the results 160A-160N directly to the aggregator node 170. In general, the aggregator node 170 may be responsible for analyzing the various individual results of the various different computations and generating one or more results based on the individual results. Accordingly, the aggregator node 170 may implement a module or process for results analysis and aggregation 180. The results analysis and aggregation module 180 may generate an aggregate result 190 of the various different computations based on the individual results 160A-160N. In one embodiment, the results analysis and aggregation module 180 may assign scores to the individual results 160A-160N or otherwise analyze the individual results as part of generating the aggregate result 190.

In various embodiments, the aggregate result 190 may represent a combination of the individual results (e.g., a new value based on some combination of the individual results) or a selection of one or more of the individual results. For example, the aggregate result 190 may be a maximum value or highest scored value, a minimum value or lowest scored value, a mean value, a median value, an earliest result, a majority result, a concatenation of individual results, or a combination thereof. The aggregate result 190 may include one or more values. In general, any suitable criteria may be used to select or generate the aggregate result 190 from the individual results 160A-160N. For example, a constraint-solving technique or other heuristic may be used to generate the aggregate result 190. In one embodiment, the aggregator node 170 may determine the aggregate result 190 based on information received from one of the master nodes 110, such as an instruction to select the maximum value, minimum value, mean value, median value, earliest result, majority result, etc.

Although one aggregator node 170 is for purposes of example and illustration, it is contemplated that different numbers and configurations of aggregator nodes may be used. In one embodiment, the aggregator node 170 may be implemented by the example computing device 3000 illustrated in FIG. 8. In various embodiments, portions of the functionality of the aggregator node 170 may be provided by the same computing device or by any suitable number of different computing devices. In various embodiments, portions of the functionality of the aggregator node 170 may be provided by the same computing device(s) or different computing device(s) as those used to provide the functionality of the master nodes 110 and/or worker nodes 120. For example, the aggregator node 170 may be implemented using one or more of the master nodes 110. If any of the components of the heterogeneous computation system 100 are implemented using different computing devices, then the components and their respective computing devices may be communicatively coupled, e.g., via a network. Each of the illustrated components in FIG. 3 may represent any combination of software and hardware usable to perform their respective functions. In some embodiments, the aggregator node 170 may be implemented as one or more virtual compute instances and/or as one or more physical compute instances.

An example implementation of the heterogeneous computation system 100 may be directed to natural language processing. A set of input data representing a set of natural language expressions may have many potential meanings or linguistic features. Using the heterogeneous computation system 100, the same set of natural language expressions may be provided to multiple detectors, where each detector is configured to detect one or more of the potential meanings or linguistic features. For example, a first detector may be configured to detect sarcasm, a second detector may be configured to detect a reference to an earlier expression, a third detector may be configured to detect a question, etc. Each of the detectors may be a computational specification (e.g., specifying instructions, program code, etc.) that may be executed or interpreted on a worker node to examine the natural language input for a particular meaning or linguistic feature. Working in parallel, each of the detectors may analyze the natural language input and generate an individual result. The individual result may indicate the presence or absence of the particular meaning or feature that the particular detector is configured to find. An aggregate result may indicate which, if any, of the meanings or features are present in the natural language input.

Figure 4A:
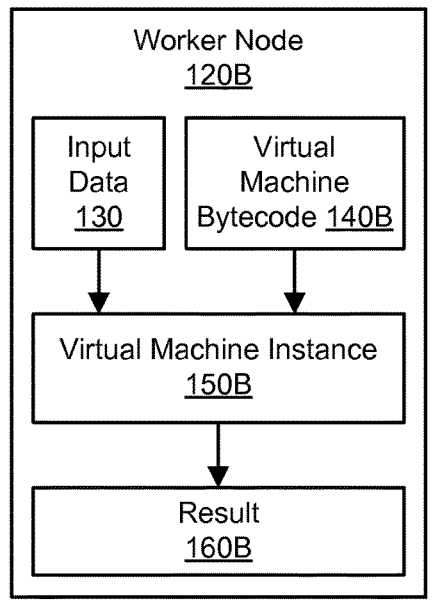
FIGS. 4A-4D illustrate example implementations of worker nodes in a system for performing heterogeneous computations on homogeneous input data, according to one embodiment.

FIGS. 4A-4D illustrate example implementations of worker nodes in a system for performing heterogeneous computations on homogeneous input data, according to one embodiment. As shown in FIG. 4A, a worker node 120B may be provided with virtual machine bytecode 140B as a computational specification. The worker node 120B may include a compatible virtual machine instance 150B as a specification interpreter. By loading the virtual machine bytecode 140B and the input data 130 (e.g., as one or more arguments) into the virtual machine instance 150B and executing the bytecode 140B to process the input data 130, the worker node 120B may produce a result 160B.

Figure 4B:
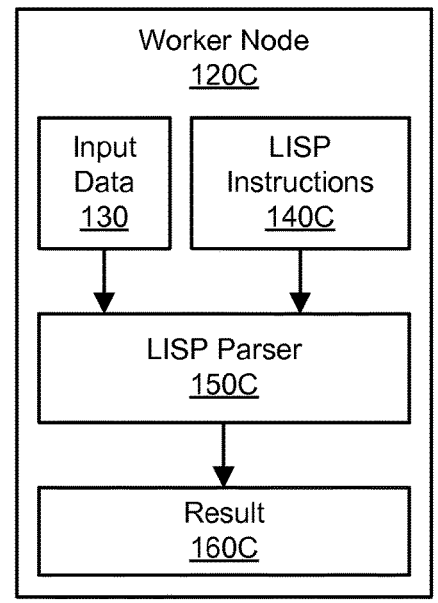

As shown in FIG. 4B, a worker node 120C may be provided with LISP instructions 140C as a computational specification. The worker node 120C may include a compatible LISP parser 150C as a specification interpreter. By loading the LISP instructions 140C and the input data 130 (e.g., as one or more arguments) into the LISP interpreter 150C and interpreting the instructions 140C to process the input data 130, the worker node 120C may produce a result 160C.

Figure 4C:
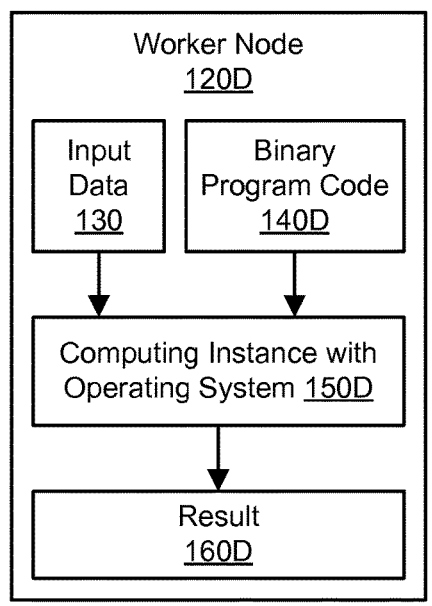

As shown in FIG. 4C, a worker node 120D may be provided with binary program code 140D as a computational specification. The worker node 120D may include a computing instance with an operating system 150D as a specification interpreter. By loading the binary program code 140D and the input data 130 (e.g., as input to stdin) into the computing instance 150D and executing the code 140D to process the input data 130, the worker node 120D may produce a result 160D.

Figure 4D:
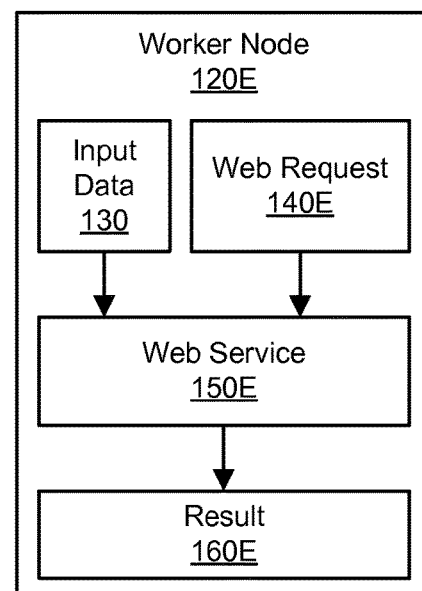

As shown in FIG. 4D, a worker node 120E may be provided with a web request (e.g., HTTP-based request) 140E as a computational specification. The worker node 120E may include a web service 150E as a specification interpreter. By loading the web request 140E and the input data 130 into the web service 150E and executing the service 140E to process the input data 130, the worker node 120E may produce a result 160E.

In various embodiments, the heterogeneous computation system 100 may employ different numbers and combinations of the example worker nodes shown in FIGS. 4A-4D. For example, the heterogeneous computation system 100 may comprise multiple worker nodes 120B including respective virtual machine instances 150B, multiple worker nodes 120C including respective LISP parsers 150C, multiple worker nodes 120D including respective computing instances 150D, or multiple worker nodes 120E including respective web services 150E. In another implementation, the heterogeneous computation system 100 may comprise different combinations of the worker nodes 120B, 120C, 120D, and/or 120E, as well as other types of worker nodes, e.g., worker nodes directed to interpreting or executing instructions in various different languages. In general, the heterogeneous computation system 100 may comprise worker nodes configured to implement any suitable computing strategies to approach the same problem using different potential solutions. In some embodiments, an individual worker node may implement a conventional MapReduce solution to address one particular approach of multiple approaches to a problem.

Figure 5:
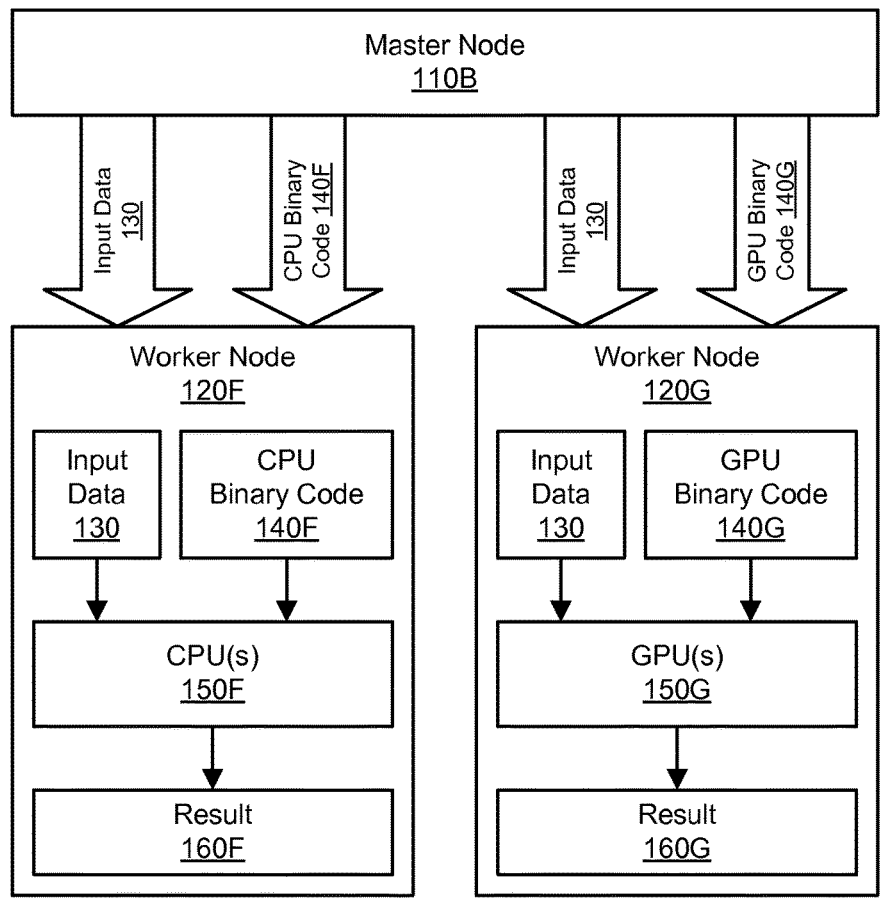
FIG. 5 illustrates an example implementation of a heterogeneous computation system for dividing a load between different sets of binary code running on different types of processors, according to one embodiment.

FIG. 5 illustrates an example implementation of a heterogeneous computation system for dividing a load between different sets of binary code running on different types of processors, according to one embodiment. The heterogeneous computation system 100 may be used to divide a load between two different computing platforms or processor types by providing different executable binary code for each platform or processor. Alternatively, the same input may be processed by different code on different platforms or processors, and the different results may be evaluated. As shown in the example of FIG. 5, a master node 110B may distribute two different computational specifications to two worker nodes 120F and 120G. The computational specifications may take the form of CPU binary code 140F and GPU binary code 140G. The two sets of code 140F and 140G may be configured to execute on different underlying processors. The CPU binary code 140F may be executed on one or more central processing units (CPUs) 150F to process all or part of the input data 130 and generate a result 160F. Similarly, the GPU binary code 140G may be executed on one or more graphics processing units (GPUs) 150G to process all or part of the input data 130 and generate a result 160G. In various embodiments, the CPU code 140F and the GPU code 140G may be programmed to perform similar tasks or different tasks using the input data 130.

Figure 6:
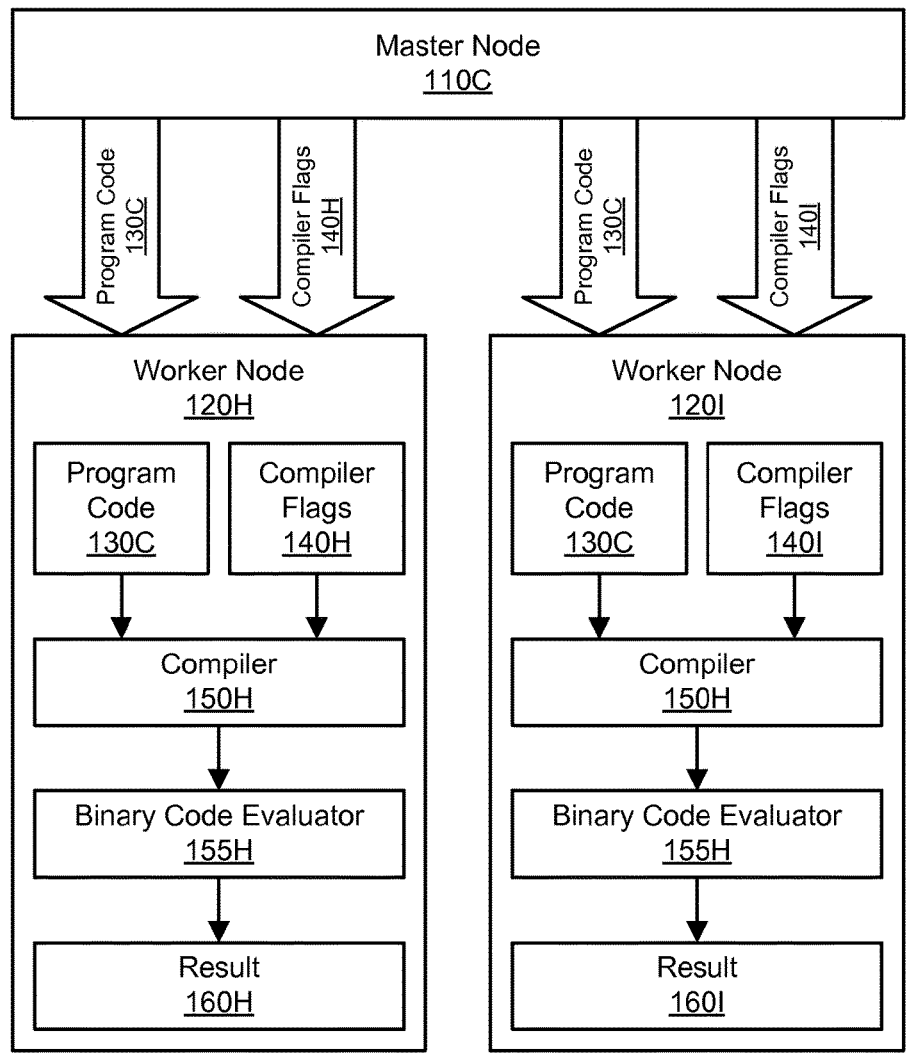
FIG. 6 illustrates an example implementation of a heterogeneous computation system for compiling the same set of program code with different compiler flags and evaluating the results, according to one embodiment.

FIG. 6 illustrates an example implementation of a heterogeneous computation system for compiling the same set of program code with different compiler flags and evaluating the results, according to one embodiment. The heterogeneous computation system 100 may be used for compiler flag optimization. By compiling the same program code with different compiler flags and then evaluating the resulting sets of binary code, an optimal set of compiler flags may be determined. As shown in the example of FIG. 6, a master node 110C may distribute the same set of high-level program code 130C with two different computational specifications to two worker nodes 120H and 120I. The computational specifications may take the form of a first set of compiler flags 140H and a second set of compiler flags 140I. Each of the worker nodes 120H and 120I may include instances of a compiler 150H and a binary code evaluator 155H. Using its local instance of the compiler 150H, the worker node 120H may compile the program code 130C with the compiler flags 140H; the worker node 120H may evaluate the resulting binary code with its local instance of the binary code evaluator 155H to generate a result 160H. Using its local instance of the compiler 150H, the worker node 120I may compile the program code 130C with the compiler flags 140I; the worker node 120I may evaluate the resulting binary code with its local instance of the binary code evaluator 155H to generate a result 160I. In one embodiment, the results 160H and 160I may include metrics related to the performance of the sets of binary program code or other aspects of the binary program code, such as the size of the code. The aggregator node 170 may analyze the results 160H and 160I to identify the best set of binary code (based on any suitable criteria) and thus the best set of compiler flags.

It is contemplated that the heterogeneous computation system 100 may be used for any suitable heterogeneous computations on substantially homogeneous inputs. For example, the heterogeneous computation system 100 may be used to simultaneously build different models describing different groups of customers of a merchant; the model that best solves the problem may then be selected. As another example, to implement a search engine using the heterogeneous computation system 100, different collections of web pages or other documents may be indexed using different techniques running concurrently. As yet another example, an input may be scored using different concurrent computations performed by different worker nodes in the heterogeneous computation system 100, and the individual scores may be combined to give an aggregate score. To implement a support vector machine using the heterogeneous computation system 100, each worker node may be responsible for computing the dot product of an input and a different set of vectors; the results may be summed together by the aggregator node 170. As another example, multiple heuristics may be performed in parallel as part of a constraint-solving solution. For bioinformatics problems, molecules may be simulated in various different ways using different worker nodes, and the results may be evaluated by the aggregator node 170. As another example, the heterogeneous computation system 100 may be used to implement machine learning techniques.

In one embodiment, the heterogeneous computation system 100 may be used to implement a heterogeneous computation marketplace that is accessible to users, e.g., over one or more networks. The heterogeneous computation marketplace may permit users to select individual computational specifications to define a set of computations to be executed to solve a problem. In one embodiment, the heterogeneous computation marketplace use any appropriate interface(s) to present a plurality of computing strategies, algorithms, or implementations of algorithms to users. A user may select a set of the presented strategies, algorithms, or implementations and cause the corresponding heterogeneous computations to be performed using the heterogeneous computation system 100. In one embodiment, the user may also provide one or more computational specifications to be used along with the selected specifications. In one embodiment, the user may supply the set of input data to be used by the heterogeneous computations. An aggregate result of the heterogeneous computations may be provided to the user. The user may also select and/or provide the one or more criteria for generating the aggregate result of the heterogeneous computations. A fee for use of the heterogeneous computation marketplace may be generated using any suitable basis. For example, the user may be charged based on the number of computational specifications selected, the amount of time used, the amount of computing resources used, or any combination thereof.

Figure 7:
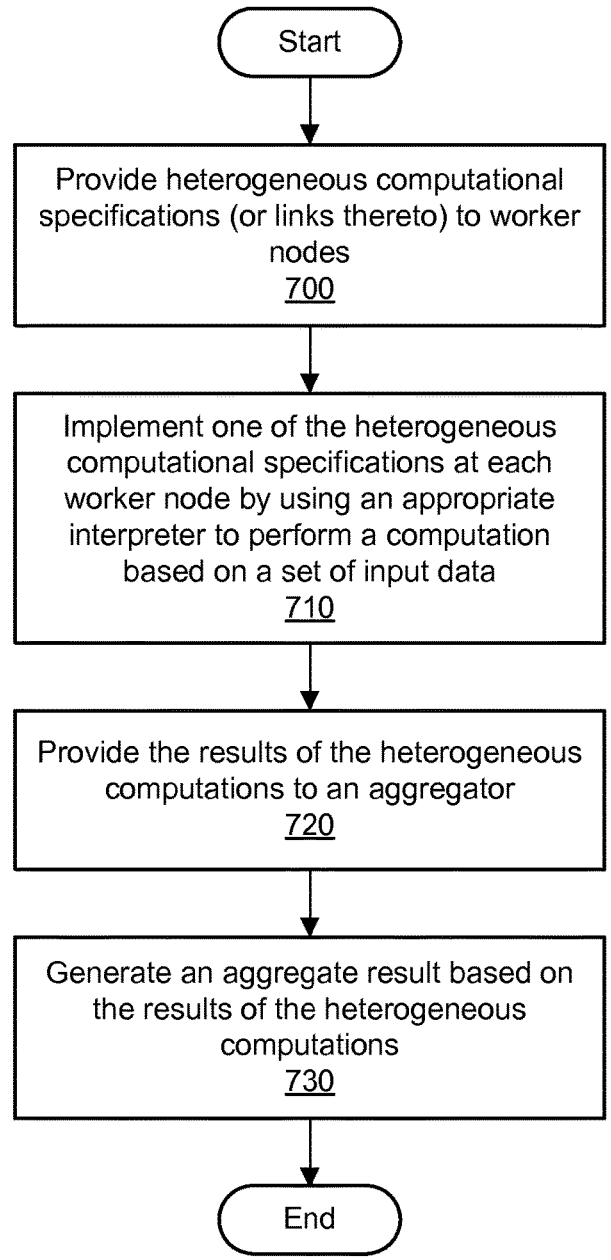
FIG. 7 is a flowchart illustrating a method for performing heterogeneous computations on homogeneous input data, according to one embodiment.

FIG. 7 is a flowchart illustrating a method for performing heterogeneous computations on homogeneous input data, according to one embodiment. As shown in 700, heterogeneous computational specifications (or links thereto) may be provided to a set of worker nodes. The computational specifications (or links thereto) may be sent to the worker nodes by one or more master nodes or coordinator process(es). In various embodiments, the heterogeneous computational specifications may specify different computations for solving the same problem or otherwise acting on the same input data. The heterogeneous computational specifications may represent different approaches, algorithms, techniques, or strategies or may represent different implementations of the same or similar approaches, algorithms, techniques, or strategies. For example, the computational specifications 140 may include sets of binary program code to be executed, sets of high-level program code to be compiled and executed, sets of instructions to be interpreted, descriptions of requests to be sent to services, requests to invoke functions or services, other suitable types of information specifying tasks or operations to be performed, or combinations thereof. In one embodiment, all or part of the input data for the heterogeneous computations may be provided to the worker nodes, e.g., by the one or more master nodes or coordinator process(es).

As shown in 710, at least one of the heterogeneous computational specifications may be implemented at each worker node. To implement one of the heterogeneous computational specifications, a worker node may use an appropriate interpreter to perform a computation based on the input data. Each computation may represent one or more tasks. Each interpreter may include any suitable components for acting upon a computational specification to perform the specified task(s) (potentially including sub-tasks or multiple operations). For example, if the computational specification represents binary code or bytecode, then the corresponding interpreter may include a suitable execution environment for the code. The interpreters at each worker node may differ or may be instances of the same interpreter based on the nature of the computational specifications. In one embodiment, the implementation of the heterogeneous computational specifications may produce results at any of the worker nodes. The computations may be performed concurrently, at least in part.

As shown in 720, the results of the heterogeneous computations may be provided to an aggregator. As shown in 730, the aggregator may generate an aggregate result based on the individual results of the heterogeneous computations. In various embodiments, the aggregate result 190 may represent a combination of the individual results or a selection of one of the individual results. For example, the aggregate result may be a maximum value or highest scored value, a minimum value or lowest scored value, a mean value, a median value, an earliest result, a majority result, a concatenation of individual results, or a combination thereof.

Illustrative Computer System

In at least some embodiments, a computer system that implements a portion or all of one or more of the technologies described herein may include a general-purpose computer system that includes or is configured to access one or more computer-readable media. FIG. 8 illustrates such a general-purpose computing device 3000. In the illustrated embodiment, computing device 3000 includes one or more processors 3010a-3010n coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010a and 3010b through 3010n (e.g., two, four, eight, or another suitable number), referred to collectively as processors 3010. Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
 a plurality of computing devices configured to implement a heterogeneous computation system comprising one or more master nodes, a plurality of worker nodes, and one or more aggregator nodes, wherein the one or more master nodes are configured to:
  send information indicative of a plurality of computational specifications to the plurality of worker nodes, wherein the plurality of computational specifications comprise definitions of a plurality of heterogeneous computations;
wherein, for a set of input data, each worker node of the plurality of worker nodes is configured to:
  load the set of input data; and
  perform one or more of the plurality of heterogeneous computations based on the plurality of computational specifications and the set of input data, wherein different ones of the worker nodes perform different respective computational specifications to solve a same problem using the same set of input data to produce respective results, and wherein the respective computational specifications to solve the same problem comprise:
    same respective algorithms configured to be concurrently implemented using the same set of input data by different types of computing platforms or different types of processors of the different ones of the worker nodes; and
wherein the one or more aggregator nodes are configured to:
  generate an aggregate result based at least on the respective results produced using the same set of input data.

2. The system as recited in claim 1, wherein the plurality of computational specifications comprise one or more sets of executable instructions, one or more sets of interpretable instructions, or one or more service requests.

3. The system as recited in claim 1, wherein the plurality of worker nodes comprise a plurality of specification interpreters, wherein the specification interpreters are configured to interpret or execute the computational specifications to produce the respective results based on the set of input data.

4. A computer-implemented method, comprising:
  distributing a plurality of computational specifications among a plurality of worker nodes, wherein the plurality of computational specifications comprise descriptions of a plurality of heterogeneous computations;
  performing the plurality of heterogeneous computations using the plurality of worker nodes, wherein individual ones of the plurality of heterogeneous computations are performed based on a set of input data and corresponding ones of the plurality of computational specifications, and wherein different ones of the worker nodes perform different respective computational specifications to solve a same problem using the same set of input data to produce respective results, and wherein the respective computational specifications to solve the same problem comprise:
    same respective algorithms configured to be concurrently implemented using the same set of input data by different types of computing platforms or different types of processors of the different ones of the worker nodes; and
  generating an aggregate result based at least on the respective results produced using the same set of input data.

5. The method as recited in claim 4, wherein the plurality of computational specifications comprise one or more sets of executable instructions, one or more sets of interpretable instructions, or one or more service requests.

6. The method as recited in claim 4, wherein performing the plurality of heterogeneous computations using the plurality of worker nodes comprises using a plurality of specification interpreters to interpret or execute the computational specifications to produce the respective results based on the set of input data.

7. The method as recited in claim 4, wherein each of at least two of the respective results is produced by a corresponding worker node of the plurality of worker nodes and is different than each other result of the respective results.

8. The method as recited in claim 4, wherein the plurality of heterogeneous computations produce the respective results at a plurality of different times.

9. The method as recited in claim 4, wherein generating the aggregate result comprises selecting a maximum result of the respective results, selecting a minimum result of the respective results, generating a mean value or a median value based on the respective results, selecting an earliest result of the respective results, selecting a majority result of the respective results, or generating a concatenation of the respective results.

10. A system, comprising:
  a plurality of computing devices comprising a plurality of processors and a plurality of memories, wherein the memories stores program instructions, and wherein the program instructions are executable by the processors to:
    concurrently perform a plurality of heterogeneous computations based on a same set of input data for individual ones of the plurality of computing devices, wherein different ones of the computing devices perform different respective computational specifications to solve a same problem using the same set of input data to produce respective results, and wherein the respective computational specifications to solve the same problem comprise:
      same respective algorithms configured to be concurrently implemented using the same set of input data by different types of computing platforms or processors of the different ones of the worker nodes; and
    generate an aggregate result based at least on the respective results produced using the same set of input data.

11. The system as recited in claim 10, wherein the plurality of computing devices implement a master node and a plurality of worker nodes, wherein the program instructions are executable by the processors to:
  distribute a plurality of computational specifications from the master node to the plurality of worker nodes, wherein the plurality of computational specifications define the plurality of heterogeneous computations, and wherein, in concurrently performing the plurality of heterogeneous computations based on the set of input data, the program instructions are executable by the processors to interpret or execute the plurality of computational specifications.

12. The system as recited in claim 11, wherein the plurality of computational specifications comprise one or more sets of executable instructions, one or more sets of interpretable instructions, or one or more service requests.

13. The system as recited in claim 11, wherein, in concurrently performing the plurality of heterogeneous computations based on the set of input data, the program instructions are executable by the processors to load the computational specifications and the set of input data into a plurality of specification interpreters.

14. The system as recited in claim 10, wherein the program instructions are executable by the processors to:
- cause a plurality of computational specifications to be presented to a user in an interface for a heterogeneous computation marketplace; and
- receive a selection of individual ones of the computational specifications from the user;
- wherein the plurality of heterogeneous computations are concurrently performed based on the selection of individual ones of the computational specifications.

15. The system as recited in claim 10, wherein the aggregate result comprises a maximum result of the respective results, a minimum result of the respective results, a mean value or a median value based on the respective results, an earliest result of the respective results, a majority result of the respective results, or a concatenation of two or more of the respective results.

16. A non-transitory computer-readable storage medium storing program instructions computer-executable to perform:
- executing a plurality of concurrent computations, wherein individual ones of the plurality of concurrent computations are based on a set of input data and on a corresponding computational specification, and wherein different ones of the computational specifications are used to solve a same problem to produce respective results using the same set of input data, and wherein at least one of the concurrent computations is executed using different instructions than other ones of the concurrent computations, and wherein the different ones of the computational specifications to solve the same problem comprise:
  - same respective algorithms configured to be concurrently implemented using the same set of input data by different types of computing platforms or processors of the different ones of the worker nodes; and
- generating an aggregate result based at least on the respective results produced using the same set of input data.

17. The non-transitory computer-readable storage medium as recited in claim 16, wherein each of the corresponding computational specifications comprise one or more sets of executable instructions, one or more sets of interpretable instructions, or one or more service requests.

18. The non-transitory computer-readable storage medium as recited in claim 16, wherein implementing the plurality of concurrent computations comprises using a plurality of specification interpreters to interpret or execute the computational specifications to produce the respective results based on the set of input data.

19. The non-transitory computer-readable storage medium as recited in claim 16, wherein individual ones of the plurality of concurrent computations process all of the set of input data to produce the respective results.

20. The non-transitory computer-readable storage medium as recited in claim 16, wherein generating the aggregate result comprises selecting a maximum result of the respective results, selecting a minimum result of the respective results, generating a mean value or a median value based on the respective results, selecting an earliest result of the respective results, selecting a majority result of the respective results, or generating a concatenation of the respective results.

* * * * *